Figure 1:
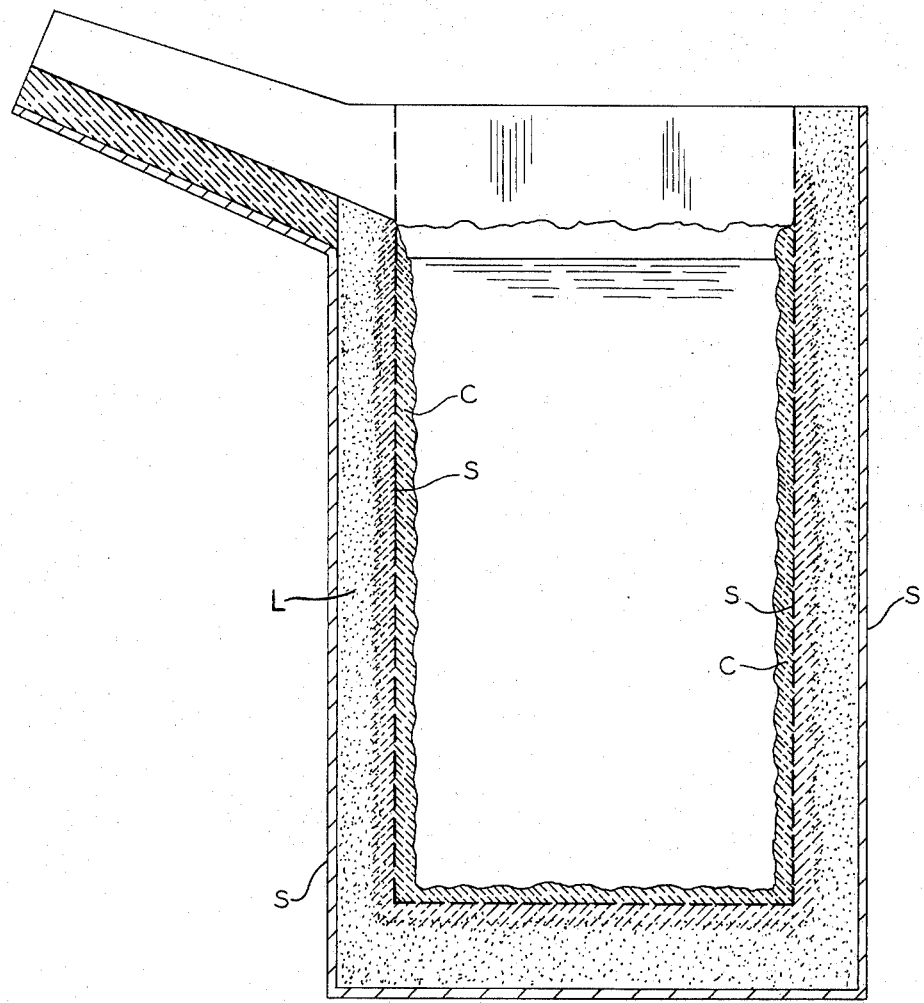

United States Patent [19]
Magoteaux

[11] 3,820,978
[45] June 28, 1974

[54] CHARGE ADDITIVE COMPOSITION TO CONTROL ELECTRICAL INDUCTION FURNACE LINING WEAR

[75] Inventor: Orville R. Magoteaux, Columbus, Ohio

[73] Assignee: Allied Mineral Products, Inc., Columbus, Ohio

[22] Filed: Feb. 26, 1973

[21] Appl. No.: 335,535

[52] U.S. Cl. ................... 75/95, 75/10 R, 75/94
[51] Int. Cl. ........................................ C22d 7/00
[58] Field of Search ............... 75/10–12, 93–95, 75/53

[56] References Cited
UNITED STATES PATENTS

| | | | |
|---|---|---|---|
| 1,238,020 | 8/1917 | Kennedy | 75/95 |
| 1,517,820 | 12/1924 | Bong | 75/95 |
| 1,534,828 | 4/1925 | Barr | 75/94 |
| 1,890,485 | 12/1932 | Amsler | 75/53 |
| 2,150,145 | 3/1939 | Avery | 75/11 |
| 2,611,692 | 9/1952 | Pesses | 75/53 |
| 3,598,170 | 8/1971 | Roberts | 75/94 |

*Primary Examiner*—L. Dewayne Rutledge
*Assistant Examiner*—Peter D. Rosenberg
*Attorney, Agent, or Firm*—Mahoney, Miller & Stebens

[57] ABSTRACT

A granular or powder refractory additive composition for use with electrical induction furnaces which is added to the initial charge or later during operation of the furnace so as to adhere to and/or react with the parent lining or slag to reduce or prevent wear. The additive composition comprises alumina as a base material with phosphate-bearing sodium oxide in the form of sodium hexametaphosphate which is especially useful with silica-base furnace linings.

7 Claims, 1 Drawing Figure

CHARGE ADDITIVE COMPOSITION TO CONTROL ELECTRICAL INDUCTION FURNACE LINING WEAR

During the melting of steel, iron, nickel and nickel-base alloys in electrical induction type furnaces provided with refractory linings to contain the metals, these metals attack the linings so that eventually the linings must be replaced.

The present invention provides a way of preventing or reducing the lining wear so as to extend its service. This is done by adding a refractory composition in granular or powder form either to the initial charge or batch or later to the molten charge during operation of the furnace. The additive composition is of such a nature according to this invention, that it will adhere to or react with the lining to provide a better wear-resistant surface.

In the attached drawing there is illustrated schematically a typical induction furnace or similar container for molten metal with which this invention may be utilized.

According to this invention the additive composition consists of an alumina base and phosphate-bearing sodium oxide in the form of sodium hexametaphosphate which is useful as an additive to furnace charges contained by a silica-base furnace lining. The sodium hexametaphosphate and water "wets" the alumina and aids in the reaction between the alumina and the silica of the liner.

Table I shows Essential Ingredients and Ranges of additives tested in melting a charge of ductile iron contained within a silica-base refractory lining. This table shows that the additive will include an alumina base with from 1 to 10 percent sodium hexametaphosphate with specific amounts preferred as indicated.

Table II shows typical analysis of forms of alumina tested in melting the iron. Different types of alumina may be used in various forms as the base material of the additive composition.

The use of the additive compositions referred to in Table I, were investigated in a 4.5-ton coreless electrical induction furnace provided with a 98 or more percent silica-rammed granular lining regularly used for the production of ductile iron at 2,820°–2,840°F. This lining is indicated in the drawing at L.

In the drawing, inner and outer metal shells are indicated at S and initially contain the granular silica-rammed liner material. When the charge is melted, the inner metal shell is melted and disappears and, therefore, is shown by broken lines. During melting, the inner portion of the granular liner is fused and a coating C is formed by the reaction of the additive composition of this invention with the granular silica liner material. This invention, however, is not limited to use with granular material rammed between the metal shells but can be used with other liner structures.

It was found that in each instance that the refractory coating C formed on the inner surface of the liner retarded the wear of the silica liner. The coating was formed on the hot surface of the liner during melting of the charge and was in the form of mullite-silica which retarded the wear of the silica liner.

In these tests, the additives were added to the cold charge or added at some other time during operation of the furnace such as, for example, before non-metal regular additions used to control metal quality, such as carbon, in the melting of ductile, gray or malleable iron.

Although the additive composition of this invention is most effective when used with silica-base liners for furnaces, it can be used with other types of liners for other types of molten metal containers and if used in sufficient amounts will form an adequate coating of refractory material to resist wear on the liner.

It will be apparent from the above description that this invention provides additives for the charge of an electrical induction furnace or similar container for molten metal for reducing wear on the refractory liner material thereof. The additive is in the form of alumina and sodium hexametaphosphate and may be added at any time during the operation of the furnace. The additive will form on the heated refractory base liner a coating on the liner which will be more refractory and more resistant to wear.

TABLE I

ESSENTIAL INGREDIENTS AND RANGES

| Essential ingredients of additives composition | Percentages | | | | | |
|---|---|---|---|---|---|---|
| | Specific | | Preferred | | Broad | |
| | Wet | Dry | Wet | Dry | Wet | Dry |
| Alumina | | | | | | |
| *Tabular alumina, 14F | 30.0 | 30.0 | 10 | 10 | 10–30 | 10–30 |
| *Tabular alumina, 28F | 30.0 | 30.0 | 10 | 10 | 10–30 | 10–30 |
| *Calcined alumina, –325 | 40.0 | 40.0 | Balance | | Balance | |
| Sodium hexametaphosphate | 1.5 | 1.5 | 5 | 3–5 | 1–10 | 1–10 |
| Water | 4.0 | | 3–6 | | 2–6 | |

TYPICAL AMOUNTS USED IN CHARGE

| Lbs. per ton of charge | 7.75 | 7.75 | 5–15 | 5–15 | 3–30 | 3–30 |

*Any one or combination of these as the base material.

TABLE II

TYPICAL ANALYSES OF ALUMINA TESTED

| Material | $Al_2O_3$ | $Fe_2O_3$ | $SiO_2$ | $Na_2O$ | $TiO_2$ | $MgO$ |
|---|---|---|---|---|---|---|
| Tabular alumina | 99 min. | <.1 | <.1 | <.1 | — | — |
| Calcined alumina | 99 min. | <.1 | <.1 | <.1 | — | — |

Having thus described the invention, what is claimed is:

1. A composition for adding to a metal-forming charge to be melted in a container having a refractory liner with a surface to contact the charge during melting consisting essentially of alumina and from 1 to 10 percent sodium hexametaphosphate.

2. A composition according to claim 1 in which the sodium hexametaphosphate is present in an amount ranging from 3 to 5 percent.

3. The method of improving the wear of a container in which a metal-forming charge is to be melted and which has a refractory liner with a surface for contacting the metal charge during melting which comprises adding to the charge a composition consisting essentially of alumina and from 1 to 10 percent sodium hexametaphosphate to produce a refractory coating at said surface of the liner in contact with the melting charge.

4. The method of claim 3 in which the composition is added to the charge in an amount ranging from 3 to 30 pounds per ton of charge.

5. The method of claim 3 in which the sodium hexametaphosphate of the additive composition is in an amount ranging from 3 to 5 percent.

6. The method of claim 5 in which the composition is added to the charge in an amount ranging from 5 to 15 pounds per ton of charge.

7. The method of claim 6 in which the refractory liner has a silica-base and the added composition reacts therewith to form mullite at the said surface of the liner contacting with the melting charge.

\* \* \* \* \*